(12) United States Patent
Mengibar et al.

(10) Patent No.: US 8,589,164 B1
(45) Date of Patent: Nov. 19, 2013

(54) METHODS AND SYSTEMS FOR SPEECH RECOGNITION PROCESSING USING SEARCH QUERY INFORMATION

(71) Applicant: Google Inc., Mountain View, CA (US)

(72) Inventors: Pedro J. Moreno Mengibar, Jersey City, NJ (US); Jeffrey Scott Sorensen, New York, NY (US); Eugene Weinstein, New York, NY (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/832,136

(22) Filed: Mar. 15, 2013

Related U.S. Application Data

(60) Provisional application No. 61/715,365, filed on Oct. 18, 2012.

(51) Int. Cl.
*G10L 15/14* (2006.01)
*G10L 15/06* (2013.01)
*G06F 17/21* (2006.01)

(52) U.S. Cl.
USPC .............................. 704/257; 704/10; 704/244

(58) Field of Classification Search
None
See application file for complete search history.

(56) References Cited

U.S. PATENT DOCUMENTS

| | | | |
|---|---|---|---|
| 6,266,637 B1 | 7/2001 | Donovan et al. | |
| 7,424,421 B2 * | 9/2008 | Okumura | 704/8 |
| 7,584,098 B2 * | 9/2009 | Yu et al. | 704/240 |
| 7,756,708 B2 | 7/2010 | Cohen et al. | |
| 7,840,405 B1 * | 11/2010 | Lee et al. | 704/243 |
| 8,131,545 B1 | 3/2012 | Moreno et al. | |
| 8,229,743 B2 * | 7/2012 | Carter et al. | 704/251 |
| 8,380,502 B1 * | 2/2013 | Franz et al. | 704/236 |
| 2008/0071542 A1 * | 3/2008 | Yu | 704/270 |
| 2009/0228280 A1 * | 9/2009 | Oppenheim et al. | 704/275 |
| 2009/0327263 A1 * | 12/2009 | Maghoul | 707/5 |
| 2011/0144995 A1 * | 6/2011 | Bangalore et al. | 704/251 |
| 2012/0290293 A1 * | 11/2012 | Hakkani-Tur et al. | 704/9 |

OTHER PUBLICATIONS

Li et al., "Leveraging multiple query logs to improve language models for spoken query recognition", Proceedings of the 2009 IEEE International Conference on Acoustics, Speech and Signal Processing, ICASSP '09, pp. 3713-3716, 2009.*

Junlan Feng, "A general framework for building natural language understanding modules in voice search," Acoustics Speech and Signal Processing (ICASSP), 2010 IEEE International Conference on, pp. 5362-5365, Mar. 14-19, 2010.*

* cited by examiner

*Primary Examiner* — Brian Albertalli
(74) *Attorney, Agent, or Firm* — McDonnell Boehnen Hulbert and Berghoff

(57) ABSTRACT

Methods and systems for speech recognition processing are described. In an example, a computing device may be configured to receive information indicative of a frequency of submission of a search query to a search engine for a search query composed of a sequence of words. Based on the frequency of submission of the search query exceeding a threshold, the computing device may be configured to determine groupings of one or more words of the search query based on an order in which the one or more words occur in the sequence of words of the search query. Further, the computing device may be configured to provide information indicating the groupings to a speech recognition system.

20 Claims, 10 Drawing Sheets

METHODS AND SYSTEMS FOR SPEECH RECOGNITION PROCESSING USING SEARCH QUERY INFORMATION

CROSS REFERENCE TO RELATED APPLICATION

The present application claims priority to U.S. Provisional patent application Ser. No. 61/715,365, filed on Oct. 18, 2012, and entitled "Methods and Systems for Speech Recognition Processing Using Search Query Information," which is herein incorporated by reference as if fully set forth in this description.

BACKGROUND

Automatic speech recognition (ASR) technology can be used to map audio utterances to textual representations of those utterances. Some ASR systems use "training" where an individual speaker reads sections of text into the speech recognition system. These systems analyze a specific voice of a person and use the voice to fine tune recognition of that speech for that person resulting in more accurate transcription. Systems that do not use training may be referred to as "Speaker Independent" systems. Systems that use training may be referred to as "Speaker Dependent" systems.

BRIEF SUMMARY

The present application discloses systems and methods for speech recognition processing. In one aspect, a method is described. The method may comprise receiving, at a computing device, information indicative of a frequency of submission of a search query to a search engine. The search query may comprise a sequence of words. The method also may comprise, based on the frequency of submission of the search query exceeding a threshold, determining, for the sequence of words of the search query, groupings of one or more words of the search query based on an order in which the one or more words occur in the sequence of words of the search query. The method further may comprise providing information indicating the groupings to a speech recognition system to update a corpus of given sequences of words. The speech recognition system may be configured to convert a given spoken utterance into a given sequence of words based on the corpus of given sequences of words.

In another aspect, a computer readable medium having stored thereon instructions that, when executed by a computing device, cause the computing device to perform functions is described. The functions may comprise receiving information indicative of a frequency of submission of a search query to a search engine. The search query may comprise a sequence of words. The functions also may comprise, based on the frequency of submission of the search query exceeding a threshold, determining, for the sequence of words of the search query, groupings of one or more words of the search query based on an order in which the one or more words occur in the sequence of words of the search query. The functions further may comprise providing information indicating the groupings to a speech recognition system to update a corpus of given sequences of words. The speech recognition system may be configured to convert a given spoken utterance into a given sequence of words based on the corpus of given sequences of words.

In still another aspect, a device is described. The device may comprise at least one processor. The device also may comprise a data storage, and program instructions in the data storage that, upon execution by the at least one processor, cause the device to receive information indicative of a frequency of submission of a search query to a search engine. The search query may comprise a sequence of words. The program instructions in the data storage, upon execution by the at least one processor, also cause the device to, based on the frequency of submission of the search query exceeding a threshold, determine, for the sequence of words of the search query, groupings of one or more words of the search query based on an order in which the one or more words occur in the sequence of words of the search query. The program instructions in the data storage, upon execution by the at least one processor, further cause the device to provide information indicating the groupings to a speech recognition system to update a corpus of given sequences of words. The speech recognition system may be configured to convert a given spoken utterance into a given sequence of words based on the corpus of given sequences of words. The speech recognition system also may include probabilities of occurrence for the given sequences of words of the corpus.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Figure 1:
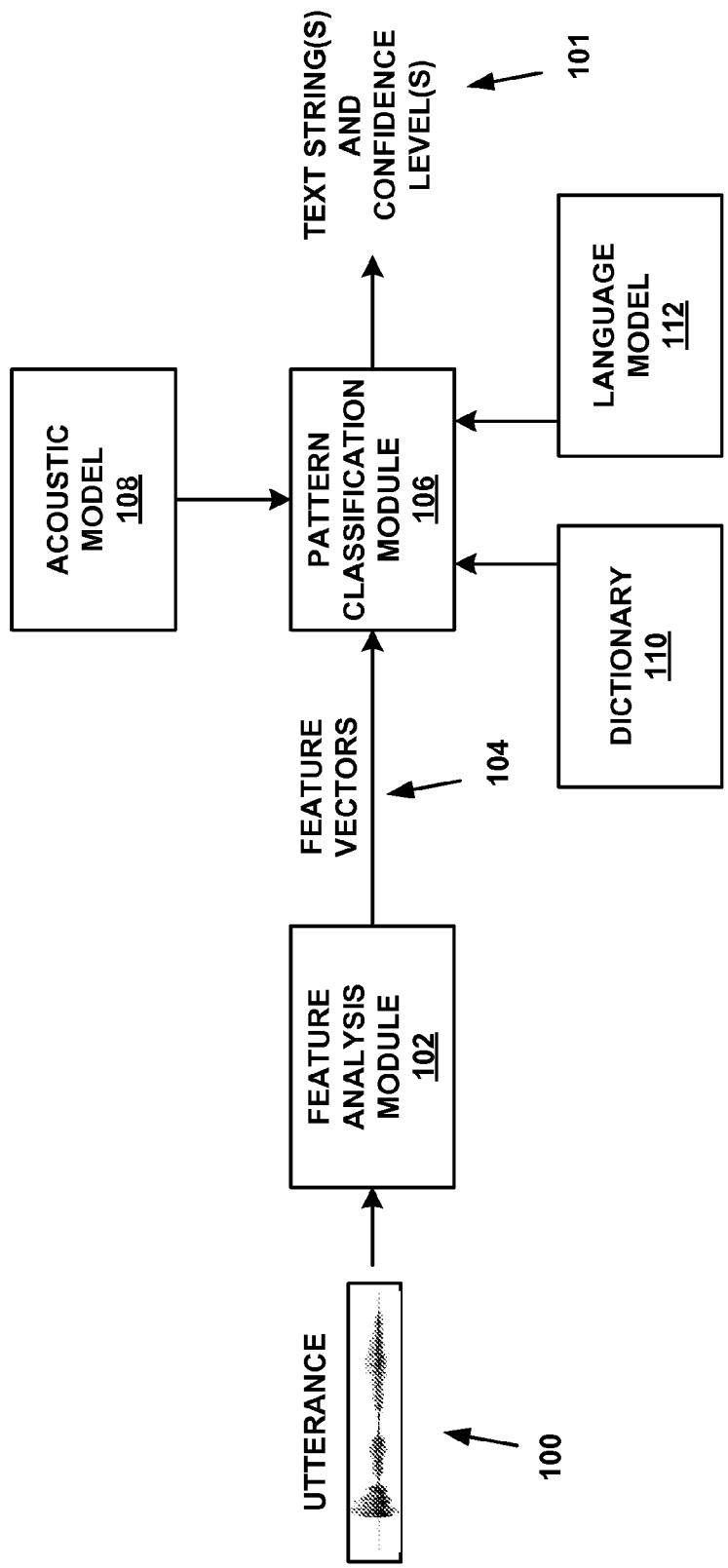
FIG. 1 illustrates an example Automatic Speech Recognition (ASR) system, in accordance with an example embodiment

The following detailed description describes various features and functions of the disclosed systems and methods with reference to the accompanying figures. In the figures, similar symbols identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein.

As computing power continues to increase, automatic speech recognition (ASR) systems and devices may be deployed in various environments to provide speech-based user interfaces. Some of these environments include residences, businesses, vehicles, etc.

In residences and businesses, for example, ASR may provide voice control over devices, such as large appliances, (e.g., ovens, refrigerators, dishwashers, washers and dryers), small appliances (e.g., toasters, thermostats, coffee makers, microwave ovens), and media devices (stereos, televisions, digital video recorders, digital video players), as well as doors, lights, curtains, and so on. In vehicles, ASR may provide hands-free use of communication technologies (e.g., cellular phones), media devices (e.g., radios and video players), mapping technologies (e.g., navigation systems), environmental control (e.g., heating and air conditioning), and so on. In an example, ASR can be used to convert a voice search query into a text string that can be sent to a search engine to obtain search results. The potential uses for voice control are many and these examples should not be viewed as limiting.

In an example, ASR can be performed at the device that receives utterances from a speaker. For this device-based ASR, each user device may be configured with an ASR module. In another example, speech recognition can be performed at a remote network server (e.g., a server or cluster of servers on the Internet). While, in this example, speech recognition may not incorporate ASR into user devices, the user devices may still be configured to have a communication path with the remote ASR system (e.g., through Internet access).

In still another example, speech recognition can be performed by use of a local ASR system that offloads performance of at least some aspects of ASR to remote devices. The local ASR system may be a dedicated device or devices performing ASR, or software configured to operate, for instance, on a general purpose computing platform. This local ASR system may be physically located in a residence, business, vehicle, etc., and may operate even if the user devices do not have Internet access.

In some examples, a user device may receive an utterance from a speaker, and transmit a representation of the utterance to the local ASR system. The local ASR system may transcribe the representation of the utterance into a textual representation of the utterance, and transmit this textual representation to the user device. Alternatively, the local ASR system may instead transmit a command based on a transcription of the utterance to the user device. This command may be based on a transcribed textual representation of the utterance, or may be derived more directly from the representation of the utterance. The command may also be of a command set or command language supported by the user device. In one example, the utterance may represent a voice search query, and the local ASR system may be configured to transmit the transcription of the voice search query to a search engine to obtain respective search results that can be communicated to the user device.

FIG. 1 illustrates an example ASR system, in accordance with an embodiment. At run-time, input to the ASR system may include an utterance 100, and the output may include one or more text strings and possibly associated confidence levels 101. Components of the ASR system may include a feature analysis module 102 that may be configured to produce feature vectors 104, a pattern classification module 106, an acoustic model 108, a dictionary 110, and a language model 112. The pattern classification module 106 may incorporate various aspects of the acoustic model 108, the dictionary 110, and the language model 112.

The example ASR system depicted in FIG. 1 is for illustration only. Other ASR system arrangements, including different components, different relationships between the components, and/or different processing, may be possible.

The feature analysis module 102 may be configured to receive the utterance 100. The utterance 100 may include an analog or digital representation of human speech, and may possibly contain background noise as well. The feature analysis module 102 may be configured to convert the utterance 100 to a sequence of one or more feature vectors 104. Each feature vector of the feature vectors 104 may include temporal and/or spectral representations of acoustic features of at least a portion of the utterance 100. For instance, a feature vector may include mel-frequency cepstrum coefficients of such a portion.

The mel-frequency cepstrum coefficients may represent the short-term power spectrum of a portion of the utterance 100. They may be based on, for example, a linear cosine transform of a log power spectrum on a nonlinear mel scale of frequency. (A mel scale may be a scale of pitches subjectively perceived by listeners to be about equally distant from one another, even though the actual frequencies of these pitches are not equally distant from one another).

To derive these coefficients, the feature analysis module 102 may be configured to sample and quantize the utterance 100, divide the utterance 100 into overlapping or non-overlapping frames of 15 milliseconds, and perform spectral analysis on the frames to derive the spectral components of each frame. The feature analysis module 102 may further be configured to perform noise removal, convert the standard spectral coefficients to mel-frequency cepstrum coefficients, and calculate first-order and second-order cepstral derivatives of the mel-frequency cepstrum coefficients.

The first-order cepstral coefficient derivatives may be calculated based on the slopes of linear regressions performed over windows of two or more consecutive frames. The second-order cepstral coefficient derivatives may be calculated based on the slopes of linear regressions performed over windows of two or more consecutive sets of first-order cepstral coefficient derivatives. However, there may be other ways of calculating the first-order and second-order cepstral coefficient derivatives.

In some examples, one or more frames of the utterance 100 may be represented by a feature vector of mel-frequency cepstrum coefficients, first-order cepstral coefficient derivatives, and second-order cepstral coefficient derivatives. For example, the feature vector may contain 13 coefficients, 13 first-order derivatives, and 13 second-order derivatives, therefore having a length of 39. However, feature vectors may use different combinations of features in other possible examples.

The pattern classification module 106 may be configured to receive a sequence of the feature vectors 104 from the feature analysis module 102 and produce, as output, one or more text string transcriptions 101 of the utterance 100. Each transcription 101 may be accompanied by a respective confidence level indicating an estimated likelihood that the transcription is correct (e.g., 80% confidence, 90% confidence, etc.).

To produce the text string transcriptions 101, the pattern classification module 106 may be configured to include, or incorporate aspects of the acoustic model 108, the dictionary 110, and/or the language model 112. In some examples, the pattern classification module 106 may also be configured to use a search graph that represents sequences of word or sub-word acoustic features that appear in spoken utterances.

The acoustic model 108 may be configured to determine probabilities that the feature vectors 104 may have been derived from a particular sequence of spoken words and/or sub-word sounds. This may involve mapping sequences of the feature vectors 104 to one or more phonemes, and then mapping sequences of phonemes to one or more words.

A phoneme may be considered to be the smallest segment of an utterance that encompasses a meaningful contrast with other segments of utterances. Thus, a word typically includes one or more phonemes. For example, phonemes may be thought of as utterances of letters; however, some phonemes may present multiple letters. An example phonemic spelling for the American English pronunciation of the word "cat" may be /k/ /ae/ /t/, including the phonemes /k/, /ae/, and /t/. Another example phonemic spelling for the word "dog" may be /d/ /aw/ /g/, including the phonemes /d/, /aw/, and /g/.

Different phonemic alphabets exist, and these alphabets may have different textual representations for the various phonemes therein. For example, the letter "a" may be represented by the phoneme /ae/ for the sound in "cat," by the phoneme /ey/ for the sound in "ate," and by the phoneme /ah/ for the sound in "beta." Other phonemic representations are possible.

Common phonemic alphabets for American English contain about 40 distinct phonemes. Each of these phonemes may be associated with a different distribution of feature vector values. The acoustic model 108 may be configured to estimate the phoneme(s) in a feature vector by comparing the feature vector to the distributions for each of the 40 phonemes, and finding one or more phonemes that are most likely represented by the feature vector.

In one example, the acoustic model 108 may include a hidden Markov model (HMM). An HMM may model a system as a Markov process with unobserved (i.e., hidden) states. Each HMM state may be represented as a multivariate Gaussian distribution that characterizes the statistical behavior of the state. Additionally, each state may also be associated with one or more state transitions that specify a probability of making a transition from a current state to another state.

When applied to an ASR system, the combination of the multivariate Gaussian distribution and the state transitions for each state may define a time sequence of feature vectors over the duration of one or more phonemes. Alternatively or additionally, the HMM may model the sequences of phonemes that define words. Thus, some HMM-based acoustic models may also take into account phoneme context when mapping a sequence of feature vectors to one or more words.

Figure 2:
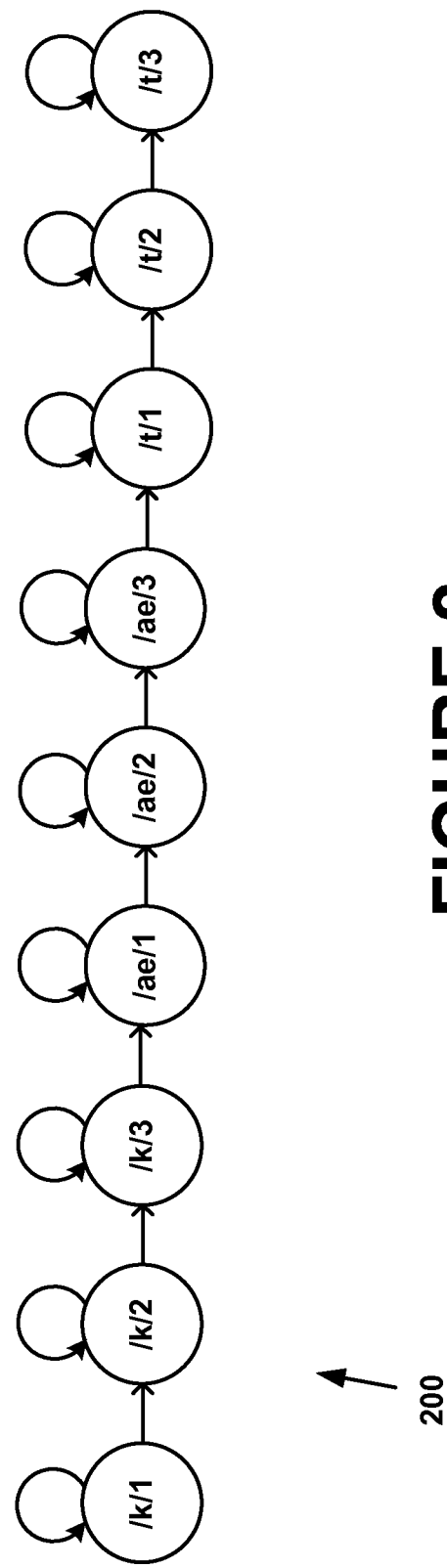
FIG. 2 illustrates aspects of an example acoustic model, in accordance with an embodiment.

FIG. 2 illustrates aspects of an example acoustic model 200, in accordance with an embodiment. The acoustic model 200 defines a sequence of phonemes that make up the word "cat." Each phoneme is represented by a 3-state HMM with an initial state, a middle state, and an end state representing the statistical characteristics at the beginning of phoneme, the middle of the phoneme, and the end of the phoneme, respectively. Each state (e.g., state /k/1, state /k/2, etc.) may represent a phoneme and may include one or more transitions.

The acoustic model 200 may represent a word by concatenating the respective 3-state HMMs for each phoneme in the word together, with appropriate transitions. These concatenations may be performed based on information in the dictionary 110. In some implementations, more or fewer states per phoneme may be used in the acoustic model 200.

The acoustic model 200 may be trained using recordings of each phoneme in numerous contexts (e.g., various words and sentences) so that a representation for each of the phoneme's states can be obtained. These representations may encompass the multivariate Gaussian distributions discussed above.

To train the acoustic model 200, a possibly large number of utterances containing spoken phonemes may each be associated with transcriptions. These utterances may be words, sentences, and so on, and may be obtained from recordings of everyday speech or some other source. The transcriptions may be automatic or manual (human-made) text strings of the utterances.

The utterances may be segmented according to their respective transcriptions. For instance, training of the acoustic model 200 may involve segmenting spoken strings into units (e.g., using either a Baum-Welch and/or Viterbi alignment method), and then using the segmented utterances to build statistical distributions for each phoneme state.

Consequently, as more data (utterances and their associated transcriptions) are used for training, a more accurate acoustic model can be produced. However, even a well-trained acoustic model may have limited accuracy when used for ASR in a domain for which it was not trained. For instance, if a given acoustic model is trained by utterances from a number of speakers of American English, this acoustic model may perform well when used for ASR of American English, but may be less accurate when used for ASR of, e.g., British English.

Also, if the acoustic model 200 is trained using utterances from a number of speakers, it will likely end up representing each phoneme as a statistical average of the pronunciation of this phoneme across all of the speakers. Thus, the acoustic model 200 when trained in this fashion may represent the pronunciation and usage of a hypothetical average speaker, rather than any particular speaker.

Referring back to FIG. 1, the dictionary 110 may define a pre-established mapping between phonemes and words. This mapping may include a list of tens or hundreds of thousands of phoneme-pattern-to-word mappings, for example. Thus, in some examples, the dictionary 110 may include a lookup table, such as Table 1 shown below. Table 1 illustrates how the dictionary 110 may list phonemic sequences that the pattern classification module 106 may be configured to identify for corresponding words that the ASR system is attempting to recognize. Therefore, the dictionary 110 may be used when developing phonemic state representations of words that are illustrated by the acoustic model 200.

TABLE 1

| Word | Phonemic Interpretation |
|---|---|
| cat | /k/ /ae/ /t/ |
| and | /ay/ /n/ /d/ |
| dog | /d/ /aw/ /g/ |

The language model 112 may be configured to assign probabilities to sequences of phonemes or words, based on a likelihood of that sequence of phonemes or words occurring in an input utterance to the ASR system. Thus, for example, the language model 112 may define a conditional probability of $w_n$ (for $n^{th}$ word in a phrase transcribed from an utterance), given values of a pattern of n−1 previous words in the phrase. An example conditional probability may be expressed as:

$$P(w_n | w_1, w_2, \ldots, w_{n-1})$$

In general, a language model may operate on n-grams, which, for example, may be sequences of n phonemes or words that are represented in the pattern classification module 106. Language models with values of n greater than 5 can require a large memory or storage space; therefore, smaller n-grams (e.g., 3-grams, which are also referred to as tri-grams) may be used to yield acceptable results efficiently.

Tri-grams are used herein for purposes of illustration. Nonetheless, any value of n may be may be used with the examples herein.

Language models may be trained through analysis of a corpus of text strings or sequences of words. This corpus may contain a large number of words, e.g., hundreds, thousands, millions or more. These words may be derived from utterances spoken by users of an ASR system and/or from written documents. For instance, the language model 112 can be determined or developed based on word patterns occurring in human speech, written text (e.g., emails, web pages, reports, academic papers, word processing documents, etc.), search queries, and so on.

From such a corpus, tri-gram probabilities can be estimated based on their respective number of appearances in the corpus. In other words, if $C(w_1, w_2, w_3)$ is the number of occurrences of a sequence of words $w_1, w_2, w_3$ in the corpus, then a probability of occurrence for the sequence of words can be expressed as:

$$P(w_3 | w_1, w_2) \approx \frac{C(w_1, w_2, w_3)}{C(w_1, w_2)}$$

Thus, the language model 112 may be represented as a table of conditional probabilities. Table 2 illustrates an example of such a table that could form the basis of the language model 112. Particularly, Table 2 contains tri-gram conditional probabilities.

TABLE 2

Tri-gram Conditional Probabilities

| |
|---|
| P(dog | cat,and) = 0.50 |
| P(mouse | cat,and) = 0.35 |
| P(bird | cat,and) = 0.14 |
| P(fiddle | cat,and) = 0.01 |

For the 2-gram prefix "cat and," Table 2 indicates that, based on observed occurrences in the corpus, 50% of the time the next 1-gram is "dog." Likewise, 35% of the time, the next 1-gram is "mouse," 14% of the time the next 1-gram is "bird," and 1% of the time the next 1-gram is "fiddle." In a fully-trained ASR system, the language model 112 would contain many more entries, and these entries may include more than just one 2-gram prefix.

Once the acoustic model 108 and the language model 112 are appropriately trained, the feature analysis model 102 and the pattern classification module 106 may be configured to perform ASR. Provided with the input utterance 100, the ASR system can search the space of valid word sequences from the language model 112 to find the word sequence with the maximum likelihood of having been spoken in the utterance 100. However, size of search space can be quite large, and methods to reduce the search space may cause such search to be more computationally efficient. As an example, heuristic techniques that can be used to reduce the complexity of the search, potentially by orders of magnitude. Other methods of limiting the search space are possible. For example, the search space can be constrained to popular phrases in a given period of time.

A finite state transducer (FST) can be used to compactly represent multiple phoneme patterns that map to a single word. Some words, such as "data," "either," "tomato," and "potato," have multiple pronunciations. The phoneme sequences for these pronunciations can be represented in a single FST per word.

This process of creating efficient phoneme-level FSTs can be carried out for each word in the dictionary 110, and the resulting word FSTs can be combined into sentence FSTs using the language model 112. Ultimately, a network of states for phonemes, words, and sequences of words can be developed and represented in a compact search graph.

Figure 3:
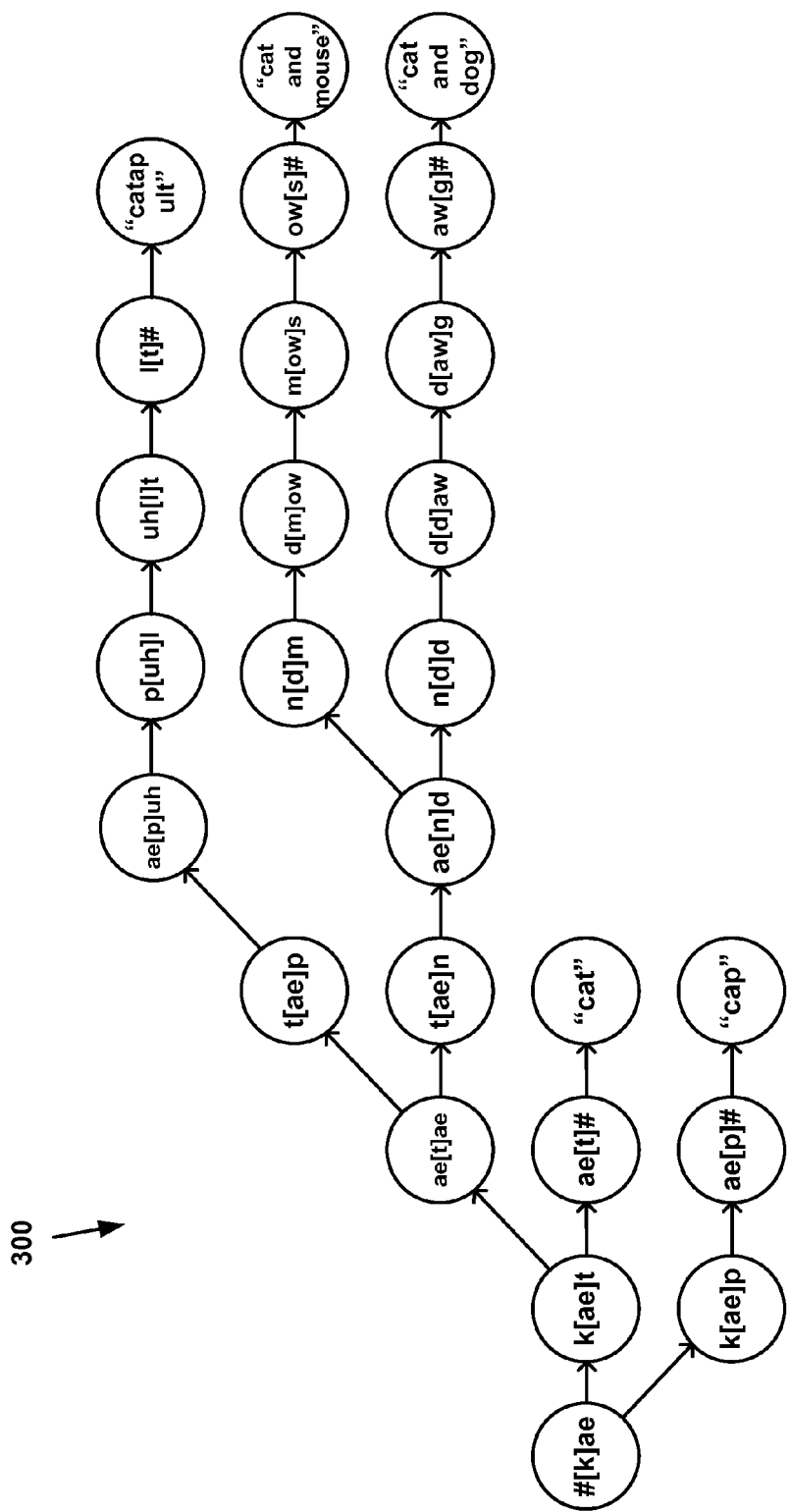
FIG. 3 illustrates an example search graph of an ASR system, in accordance with an embodiment.

FIG. 3 illustrates an example search graph 300 of an ASR system, in accordance with an embodiment. This example search graph 300 is smaller and less complex than a search graph that may be used in an ASR system, and is used for illustration. Particularly, the search graph 300 was trained with five input utterances, "catapult," "cat and mouse," "cat and dog," "cat," and "cap."

Each circle in the search graph 300 may represent a state associated with the processing of an input utterance that has been mapped to phonemes. For purposes of simplicity, each phoneme in the search graph 300 is represented with a single state rather than multiple states. Also, self-transitions are omitted from the search graph 300 to simplify FIG. 3.

States in the search graph 300 are named based on a current phoneme context of the input utterance, using the format "x[y]z" to indicate that the current phoneme being considered, y, has a left-context of the phoneme x and a right context of the phoneme z. In other words, the state "x[y]z" indicates a point in processing an utterance in which the current phoneme being considered is y, the previously considered phoneme in the utterance is x, and the next phoneme to be considered in the utterance is z. The beginning of an utterance and the end of an utterance are represented by the "#" character, and also may be referred to as null phonemes.

Terminal states may be represented by a recognized word or phrase in quotes. The search graph 300 includes five terminal states, representing recognition of the words or sequences of words (i.e., phrases) such as "catapult," "cat and mouse," "cat and dog," "cat," and "cap."

Transitions from one state to another may represent an observed ordering of phonemes in the corpus. For instance, the state "#[k]ae" represents the recognition of a "k" phoneme with a left context of a null phoneme and a right context of an "ae" phoneme. There are two transitions from the state "#[k]ae"—one for which the next phoneme (the phoneme after the "ae") is a "t" and another for which the next phoneme is a "p."

Based on the acoustic model 108, the dictionary 110, and the language model 112, costs may be assigned to one or more of the states and/or transitions. For example, if a particular phoneme pattern is rare, a transition to a state representing that phoneme pattern may have a higher cost than a transition to a state representing a more common phoneme pattern. Similarly, the conditional probabilities from the language model (see Table 2 for examples) may also be used to assign costs to states and/or transitions. For instance, in Table 2, given a phrase with the words "cat and," the conditional probability of the next word in the phrase being "dog" is 0.5, while the conditional probability of the next word in the phrase being "mouse" is 0.35. Therefore, the transition from state "ae[n]d" to state "n[d]m" may have a higher cost than the transition from state "ae[n]d" to state "n[d]d."

The search graph 300, including any states, transitions between states, and associated costs therein, may be used to estimate text string transcriptions for new input utterances. For example, the pattern classification module 106 may determine a sequence of one or more words that match an input utterance based on the search graph 300. The pattern classification module 106 may be configured to attempt to find:

$$w^* = \mathrm{argmax}_w P(a|w) P(w)$$

where a is a stream of feature vectors derived from the input utterance, P(a|w) represents the probability of those feature vectors being produced by a word sequence w, and P(w) is the probability assigned to w by the language model 112. For example, P(w) may be based on n-gram conditional probabilities as discussed above, as well as other factors. The function $\text{argmax}_w$ may return the value of w that maximizes P(a|w)P(w).

Referring back to FIG. 1, to find text strings that may match the utterance 100, the pattern classification module 106 may be configured to attempt to find paths from an initial state in the search graph 300 to a terminal state in the search graph 300 based on the feature vectors 104. This process may involve the pattern classification module 106 performing a breadth-first search, A-star (A*) search, beam search, or some other type of search on the search graph 300. The pattern classification module 106 may be configured to assign a total cost to one or more paths through the search graph 300 based on costs associated with the states and/or transitions of associated with each path. Some of these costs may be based on, for instance, a confidence level that a particular segment of the utterance maps to a particular sequence of phonemes in the path.

As an example, the utterance 100 may include the phrase "cat and dog," and the pattern classification module 106 may be configured to step through the search graph 300 phoneme by phoneme to find the path beginning with initial state "#[k]ae" and ending with terminal state "cat and dog." The pattern classification module 106 may also be configured to find one or more additional paths through the search graph 300. For example, the pattern classification module 106 may further be configured to associate the utterance 100 with the path with initial state "#[k]ae" and ending with terminal state "cat and mouse," and with the path with initial state "#[k]ae" and ending with terminal state "catapult." Nonetheless, the pattern classification module 106 may be configured to assign a lower cost (or a higher probability of occurrence) to the path with terminal state "cat and dog" than to other paths. Consequently, the path with terminal state "cat and dog" may be selected as the most likely transcription for the input utterance 100.

ASR systems can operated in many different ways. The examples described above are presented for purposes of illustration and may not be the only way in which an ASR system operates.

As described above, search space in a speech recognition database of an ASR system can be quite large. In some examples, ASR systems, to create the speech recognition database, may be configured to mine document sources such as typed queries, news articles, and other materials to generate statistical language models. A language model may assign a certain probability to every possible word sequence, for example. In examples, the language model may allow word sequences that do not occur in the documents sources, i.e., the language model may allow permutations and combinations of words of phrases that occur or do not occur in the document sources. Generalizing to sequences that do not occur in the documents sources may be referred to as smoothing.

Smoothing can be useful since a user may utter unique or new phrases that may not exist in the document sources. However, allowing for permutations and combinations of words may produce nonsensical word sequences. For example, if a source phrase is "show me football results," a nonsensical word sequence may be "show results football me."

A reduction in the search space may cause ASR systems to be more computationally efficient. Generally, users of ASR systems may produce utterances with a high degree of repeatability. In some examples repetitions of utterances may be based on trends of indefinite duration (e.g., results for a seasonal sport). In other examples, repetitions of utterances may be predictable based on popularity of topics with which the utterances may be associated (e.g., utterances associated with a current event of a given duration such as the Olympics). In examples, an ASR system may be configured to utilize such predictable repetitions to generate computationally efficient language models.

In an example, for the ASR system to be computationally efficient, the ASR system may be configured to generate sequences of words based on popular phrases. Further, instead of the language model allowing every single sequence of words of a popular phrase to be hypothesized regardless of the order of the words in the popular phrase, the ASR system may be configured to determine a set of groupings or subsequences of words of the popular phrase such that the groupings or the subsequences include words in the same order in which the words occur in the popular phrase.

As an example for illustration, a popular phrase may include five words in a given sequence "word1 word2 word3 word4 word5." A given language model may allow a subsequence or grouping "word2 word3 word5"; however, a more efficient language model may not, since this subsequence is not in the source popular phrase. In this manner, search space for the ASR system may be limited or reduced allowing for greater accuracy and computational efficiency.

Figure 4:
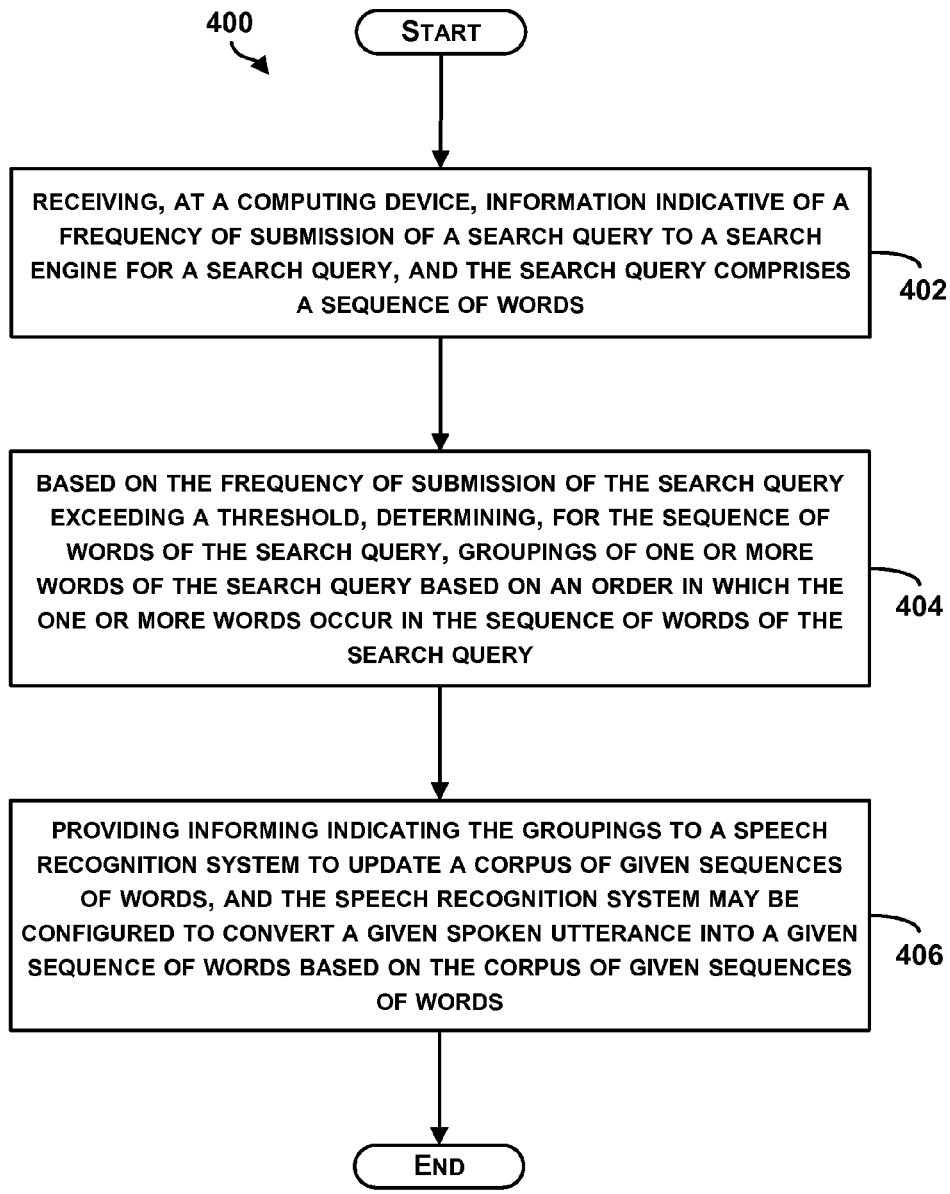
FIG. 4 is a flowchart of an example method for speech recognition processing, in accordance with an embodiment.

FIG. 4 is a flowchart of an example method for efficient speech recognition, in accordance with an embodiment.

The method 400 may include one or more operations, functions, or actions as illustrated by one or more of blocks 402-406. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation In addition, for the method 400 and other processes and methods disclosed herein, the flowchart shows functionality and operation of one possible implementation of present examples. In this regard, each block may represent a module, a segment, or a portion of program code, which includes one or more instructions executable by a processor for implementing specific logical functions or steps in the process. The program code may be stored on any type of computer readable medium or memory, for example, such as a storage device including a disk or hard drive. The computer readable medium may include a non-transitory computer readable medium or memory, for example, such as computer-readable media that stores data for short periods of time like register memory, processor cache and Random Access Memory (RAM). The computer readable medium may also include non-transitory media or memory, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example.

In addition, for the method 400 and other processes and methods disclosed herein, each block in FIG. 4 may represent circuitry that is wired to perform the specific logical functions in the process.

At block 402, the method 400 includes receiving, at a computing device, information indicative of a frequency of submission of a search query to a search engine, and the search query may comprise a sequence of words. The computing device can be, for example, a mobile telephone, personal digital assistant (PDA), laptop, notebook, or netbook computer, tablet computing device, a wearable computing device, a server in a cloud-based computing system, etc.

In an example, an abrupt increase in search query activity, commonly referred to as spiking, can result from a number of sources. Spiking can result from regular and popular occurrences such as a holiday or sporting event, or from irregular events such as high profile news items. In one example, the computing device (e.g., a server) may be configured to receive information associated with tracking a frequency of submission of a search query (or a plurality of search queries) to a search engine in a given period of time to identify popular or spiking queries. A given search query may be a text string (phrase) or a voice search query uttered by a user of a given device (e.g., a mobile telephone), for example. In examples, popular or spiking queries can be identified or extracted every day, every week, or within any other unit of time.

Referring back to FIG. 4, at block 404, the method 400 includes, based on the frequency of submission of the search query exceeding a threshold, determining, for the sequence of words of the search query, groupings of one or more words of the search query based on an order in which the one or more words occur in the sequence of words of the search query. In an example, based on the information indicative of a frequency of submission of a search query to a search engine, the computing device may be configured to determine a metric indicative of popularity of the search query, and to identify whether the search query is popular in the given period of time. For instance, the computing device may be configured to, based on historical use of search engine, determine a threshold such that if the frequency of submission of the search query exceeds the threshold, the search query can be designated as a popular or spiking search query.

In an example, the computing device may be configured to determine a metric based on a time series analysis of submission of the query over time and compare the metric to a threshold to determine popularity of the query. The metric may, for example, be related to query acceleration or velocity. Query velocity, for example, can be calculated as the inverse of a difference in time between an instant query request and a most recent query request. The difference in time can be calculated as: dt=(time of this query instance-last time query was seen), and query velocity can be determine as 1/dt. Query acceleration for a given query can be determined, as a difference between a current query velocity (or an average query velocity) and a previously calculated query velocity (or previously calculated average query velocity) determined at a previous time, multiplied by an instantaneous query velocity. The metric can be a function of the query velocity or the query acceleration or other parameters determined based on the time series analysis of the submission of the query over time. Other parameters or method of calculating these parameters are possible.

As an example for illustrating the method 400, the computing device may be configured to determine two popular phrases, based on respective frequency of submission of the two queries to the search engine: "hello world I am here," and "world war two." Each of the two search queries comprises a sequence of words in a given order. For example, the search query "world war two" includes the three words "world," "war," and "two" in that sequence.

The computing device may be configured to determine groupings of words based on an order in which the words occur in a corresponding search query. For example, with respect to the search query "world war two," the computing device may be configured to determine the following groupings of words:

world
world war
world war two
war
war two
two

These groupings may also be referred to as factors. For a large set of sequences, the groupings may be quadratic in a size of a given search query; thus, enumerating all the groupings of words may be prohibitive. To determine the factors or groupings more efficiently, the computing device may be configured to determine or generate an automaton representation and a factor graph for the search queries. The factor graph may represent the groupings more compactly and may allow for more efficient searching.

Figure 5A:
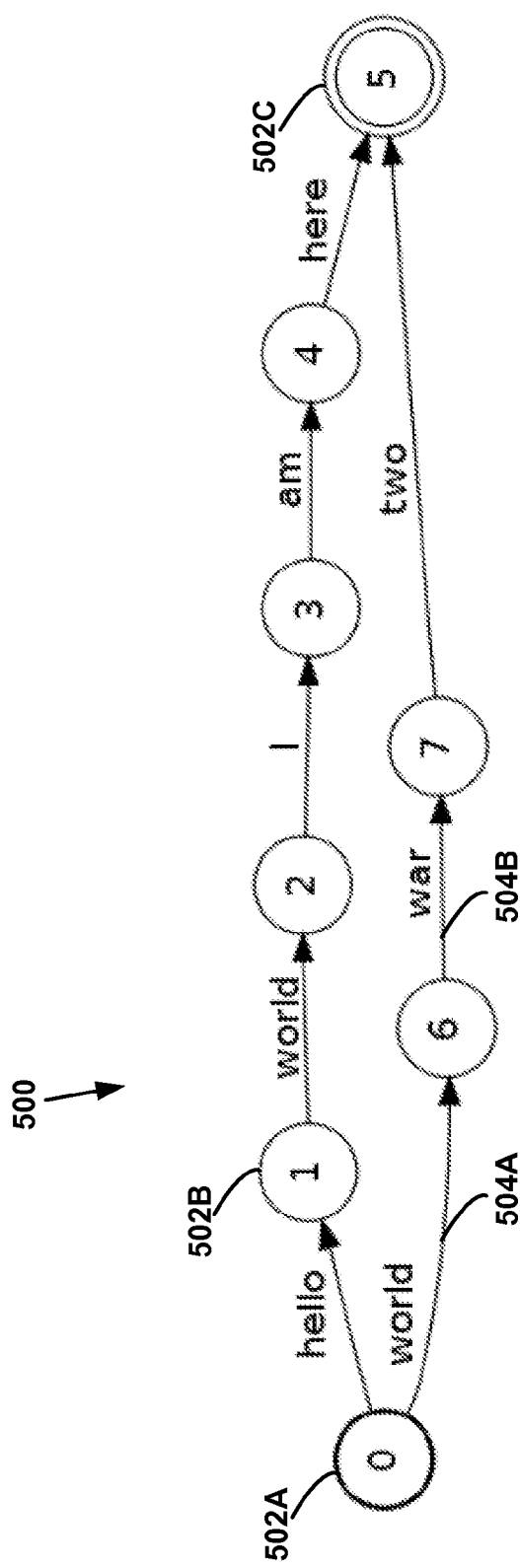
FIG. 5A illustrates an example automaton representation for example search queries, in accordance with an embodiment.

FIG. 5A illustrates an example automaton representation 500 for example search queries, in accordance with an embodiment. The automaton representation 500 represents both search queries "hello world I am here," and "world war two." The automaton representation 500 includes automaton states such as an initial state 502A, an intermediate state 502B, and a terminal state 502C. The automaton representation 500 also includes automaton arcs such as automaton arcs 504A and 504B, and each automaton arc may correspond to a word from the sequence of words of a given search query.

Figure 5B:
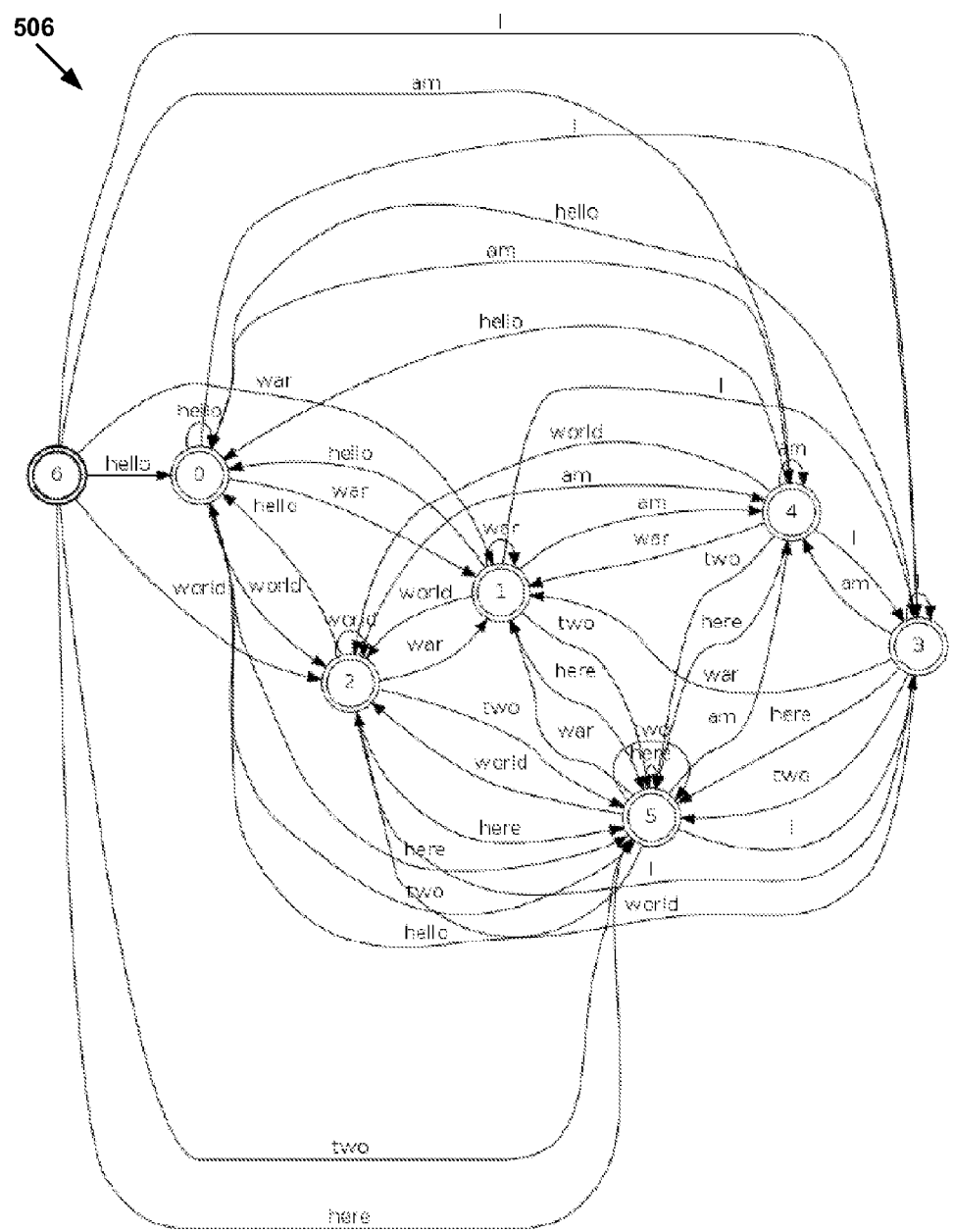
FIG. 5B illustrates an example bi-gram language model for the example search queries, in accordance with an embodiment.

FIG. 5B illustrates an example bi-gram language model 506 for the example search queries, in accordance with an embodiment. The language model 506 allows for all possible groupings of words of the search queries regardless of the order of the words in the corresponding search query. As shown in FIG. 5B, the language model 506 is complex and may allow for nonsensical groupings of words such as: "hello world here I."

Figure 5C:
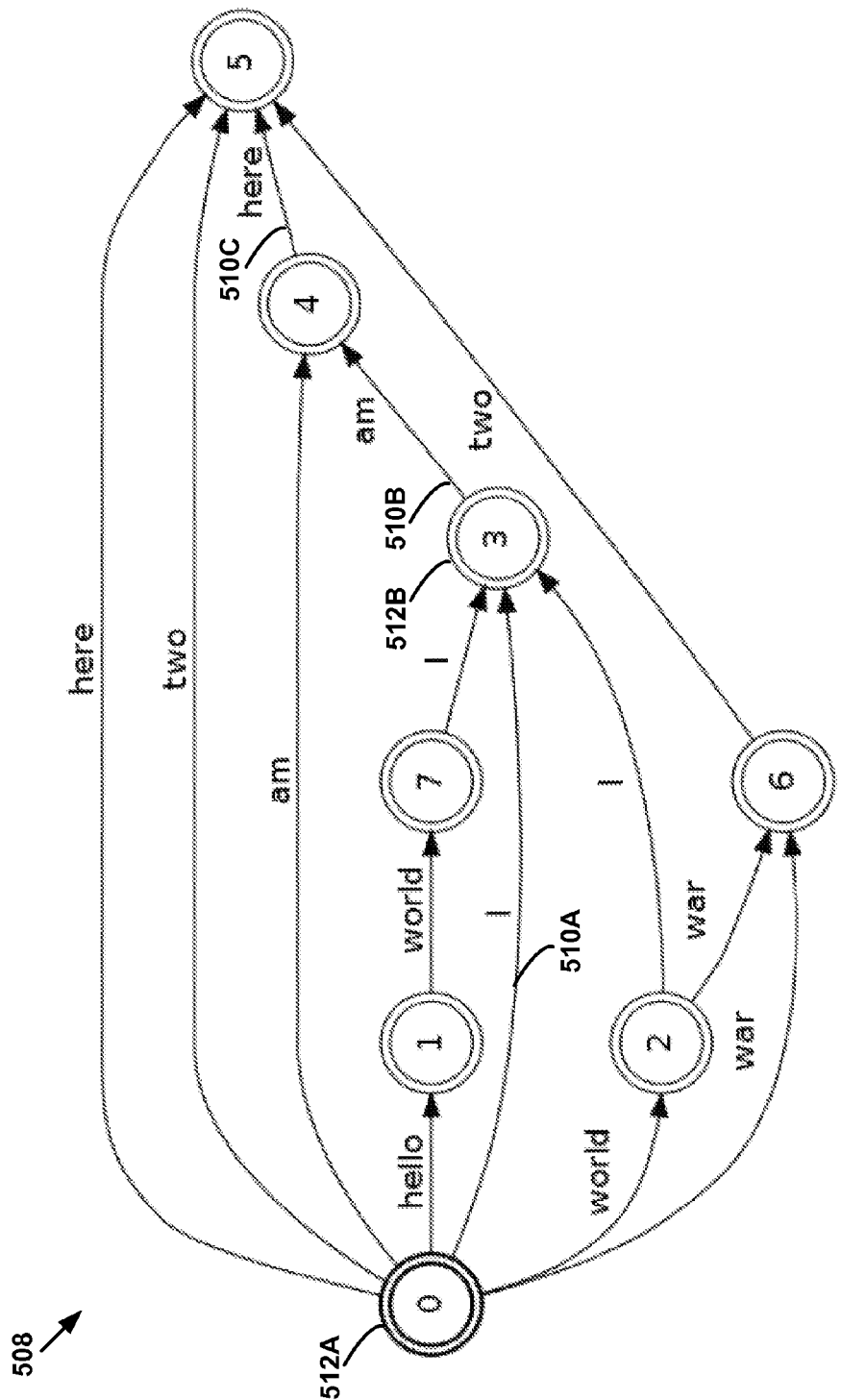
FIG. 5C illustrates an example factor graph for the example search queries, in accordance with an embodiment.

In contrast, a factor graph that compactly represents possible groupings of words of the given search query, based on the order of the words in the search query, can be generated based on the automaton representation 500. FIG. 5C illustrates an example factor graph 508 for the example search queries, in accordance with an embodiment. The factor graph 508 is less complex than the language model 506 depicted in FIG. 5B, and allows for grouping of words based on the order of the words in the corresponding search query.

As an example, to determine a given grouping of words, the computing device may be configured to select a word represented by an automaton arc (e.g., arc 510A) connected to a first automaton state (e.g., initial state 512A); continue to a second automaton state (e.g., state 512B) adjacent to the first automaton state; and select a word represented by a second arc (e.g., arc 510B) to determine the grouping "I am," for example. A given grouping of the groupings may be allowed to begin at any given state in the factor graph 508. The factor graph 508 may allow for groupings such as "hello world I," but does not allow "hello I"; in other words, the factor graph 508 does not allow skipping words or deviating from the order of the words in a source search query. In this manner, the factor graph 508 can be considered a compact and efficient way of representing groupings of words on a given search query based on an order in which the words occur in the given search query.

The computing device may be configured to frequently (e.g., every day) identify popular or spiking queries (as described above at block 402) and build or generate a factor graph, such as the factor graph 508, for the queries. Generating the factor graph such as the factor graph 508 may be more efficient than building a full language model such as the language model 506. Furthermore, the factor graph 508 may yield more flexibility over allowing only verbatim spiking queries due to the fact that the factor graph 508 efficiently allows subsequences. For example, if "Albert Einstein Relativity" is identified as a popular or spiking query, then a corresponding factor graph may allow the groupings "Einstein Relativity" and "Albert Einstein," which, when submitted to a search engine, may result in similar search results to the popular query "Albert Einstein Relativity."

Referring back to FIG. 4, at block 406, the method 400 includes providing information indicating the groupings to a speech recognition system to update a corpus of given sequences of words, and the speech recognition system is configured to convert a given spoken utterance into a given sequence of words based on the corpus of given sequences of words. The computing device (e.g., server), may be coupled to or in communication with a speech recognition system such as the ASR system depicted in FIG. 1. In one example, the computing device may include the speech recognition system.

In examples, the speech recognition system may include a speech recognition database that includes a corpus of given sequences of words that may have been produced by a language model such as the language mode 112 in FIG. 1. The speech recognition system may be configured to receive a given spoken utterance, and match the given spoken utterance to a sequence of words from the corpus of given sequences of words as described in FIGS. 1-3, for example. The computing device may be configured to generate a factor graph depicting the groupings of words of the spiking search query, and provide the factor graph and/or groupings to the speech recognition system to include the groupings in (e.g., augment) the corpus.

In some examples, after updating the corpus with the groupings corresponding to a popular search query, the computing device may be configured to cause a search space in the corpus to be constrained. For instance, the search space may be constrained to at least the groupings represented by the search graph. In another example, the speech recognition system may be configured to attempt to match a given spoken utterance to one of the groupings before attempting to match the given spoken utterance to other word sequences in the corpus.

In still another example, the speech recognition system may be configured to generate a search graph, such as the search graph 300, corresponding to the factor graph generated for the popular query by the computing device. The search graph corresponding to the factor graph may be integrated into a larger search graph for other sequences of words, for example. To find text strings that may match a given utterance, the speech recognition system may be configured to attempt to find paths from an initial state in the search graph to a terminal state in the search graph, and may be configured to assign a total cost to one or more paths through the search graph based on costs associated with the states and/or transitions associated with each path. The paths corresponding to the groupings of words of the factor graph may be assigned less cost (i.e., assigned higher probability) than other paths, for example.

In examples, the speech recognition system may receive spoken utterances that are not related to and do not match any of the groupings of words of the popular or spiking search query. To handle this possibility, in one example, the speech recognition system may be configured to constrain search space to the factor graph, i.e., attempt to trace paths of the factor graph to identify a high-confidence match, and if such an attempt fails, the speech recognition system may be configured to utilize a full language model or the rest of the corpus to identify a match. In another example, the speech recognition system may be configured to trace the factor graph and the full language model in parallel and terminate searching when a match is identified in either the factor graph or the full language model. Other search strategies that combine the search graph and the full language model are possible.

Also, as described above with respect to the language model 112, a given sequence of words in the corpus, may be assigned probabilities of occurrence that can be estimated based on respective number of appearances in the corpus. Thus, in addition to providing the groupings to the speech recognition system, the computing device may be configured to update the probabilities of occurrence based on the groupings. For instance, the computing device may be configured to assign respective probabilities of occurrence to the groupings that are higher than given probabilities of occurrence of other sequences of words in the corpus. The assigned respective probabilities may be based on how popular the search query is, e.g., based on the information indicative of the frequency of submission of the search query to the search engine.

In some examples, the probabilities of occurrences for the groupings may be time-varying. In some instances, popularity of a given search query may decrease over time. As an example for illustration, a search query about results of the Olympics may be popular for a period of time of the Olympics and perhaps for a given period of time after the Olympics; however, popularity of such a search query may decrease over time. Therefore, in this example, the computing device may be configured to cause the probabilities of occurrence of the groupings to decay over. In other examples, the computing device may be configured to continuously evaluating how popular the search query is, and accordingly update or modify the probabilities based on updated changes to popularity of the search query.

Figure 6:
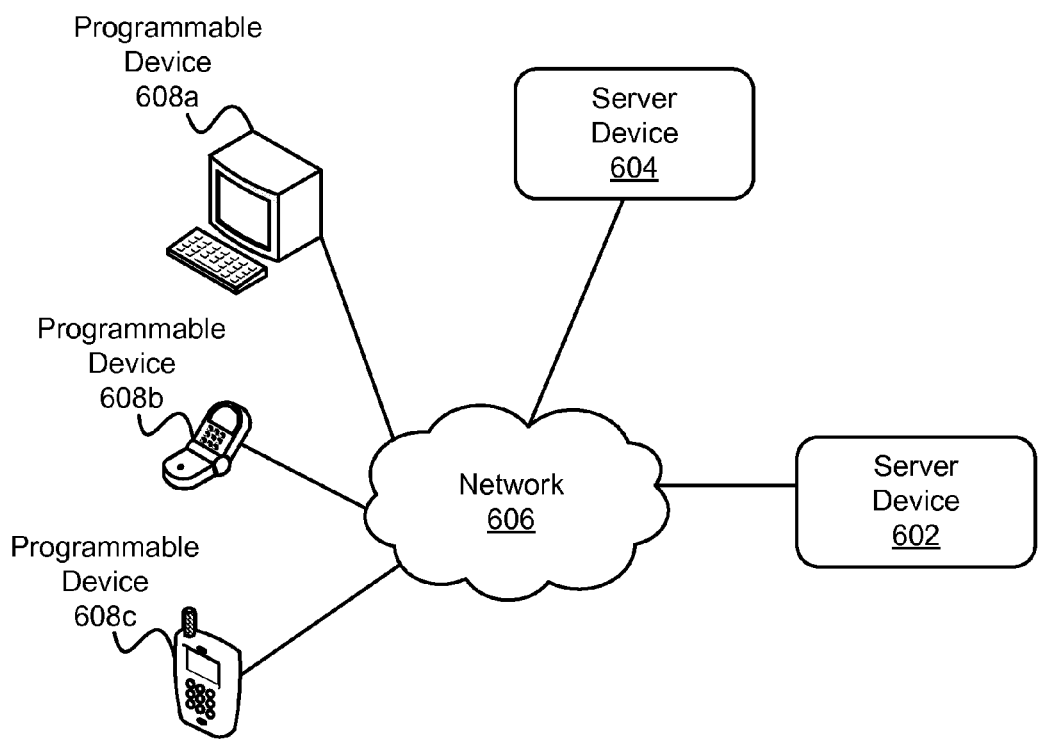
FIG. 6 illustrates an example distributed computing architecture, in accordance with an example embodiment.

FIG. 6 illustrates an example distributed computing architecture, in accordance with an example embodiment. FIG. 6 shows server devices 602 and 604 configured to communicate, via network 606, with programmable devices 608a, 608b, and 608c. The network 606 may correspond to a LAN, a wide area network (WAN), a corporate intranet, the public Internet, or any other type of network configured to provide a communications path between networked computing devices. The network 606 may also correspond to a combination of one or more LANs, WANs, corporate intranets, and/or the public Internet.

Although FIG. 6 shows three programmable devices, distributed application architectures may serve tens, hundreds, or thousands of programmable devices. Moreover, the programmable devices 608a, 608b, and 608c (or any additional programmable devices) may be any sort of computing device, such as an ordinary laptop computer, desktop computer, network terminal, wireless communication device (e.g., a tablet, a cell phone or smart phone, a wearable computing device, etc.), and so on. In some examples, the programmable devices 608a, 608b, and 608c may be dedicated to the design and use of software applications. In other examples, the programmable devices 608a, 608b, and 608c may be general purpose computers that are configured to perform a number of tasks and may not be dedicated to software development tools.

The server devices 602 and 604 can be configured to perform one or more services, as requested by programmable devices 608a, 608b, and/or 608c. For example, server device 602 and/or 604 can provide content to the programmable devices 608a-608c. The content can include, but is not limited to, web pages, hypertext, scripts, binary data such as compiled software, images, audio, and/or video. The content can include compressed and/or uncompressed content. The content can be encrypted and/or unencrypted. Other types of content are possible as well.

As another example, the server device 602 and/or 604 can provide the programmable devices 608a-608c with access to software for database, search, computation, graphical, audio (e.g. speech recognition), video, World Wide Web/Internet utilization, and/or other functions. Many other examples of server devices are possible as well.

The server devices 602 and/or 604 can be cloud-based devices that store program logic and/or data of cloud-based applications and/or services. In some examples, the server devices 602 and/or 604 can be a single computing device residing in a single computing center. In other examples, the server device 602 and/or 604 can include multiple computing devices in a single computing center, or multiple computing devices located in multiple computing centers in diverse geographic locations. For example, FIG. 6 depicts each of the server devices 602 and 604 residing in different physical locations.

In some examples, data and services at the server devices 602 and/or 604 can be encoded as computer readable information stored in non-transitory, tangible computer readable media (or computer readable storage media) and accessible by programmable devices 608a, 608b, and 608c, and/or other computing devices. In some examples, data at the server device 602 and/or 604 can be stored on a single disk drive or other tangible storage media, or can be implemented on multiple disk drives or other tangible storage media located at one or more diverse geographic locations.

Figure 7A:
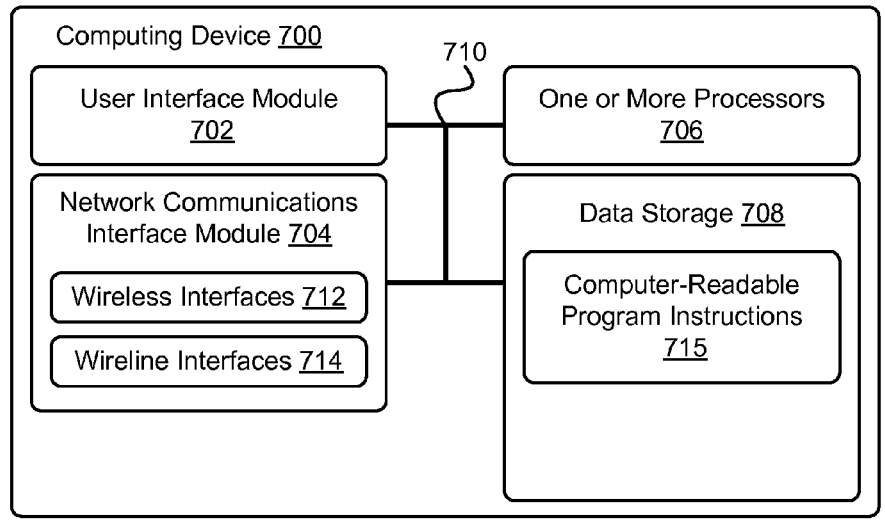
FIG. 7A is a block diagram of an example computing device, in accordance with an example embodiment illustrates.

FIG. 7A is a block diagram of a computing device (e.g., system) in accordance with an example embodiment. In particular, computing device 700 shown in FIG. 7A can be configured to perform one or more functions of the server devices 602, 604, network 606, and/or one or more of the programmable devices 608a, 608b, and 608c. The computing device 700 may include a user-interface module 702, a network communications interface module 704, one or more processors 706, and data storage 708, all of which may be linked together via a system bus, network, or other connection mechanism 710.

The user-interface module 702 can be operable to send data to and/or receive data from external user input/output devices. For example, user-interface module 702 can be configured to send and/or receive data to and/or from user input devices such as a keyboard, a keypad, a touchscreen, a computer mouse, a track ball, a joystick, a camera, a voice recognition/synthesis module, and/or other similar devices. The user-interface module 702 can also be configured to provide output to user display devices, such as one or more cathode ray tubes (CRT), liquid crystal displays (LCD), light emitting diodes (LEDs), displays using digital light processing (DLP) technology, printers, light bulbs, and/or other similar devices, either now known or later developed. The user-interface module 702 can also be configured to generate recognized speech or audible output(s), and may include a speaker, speaker jack, audio output port, audio output device, earphones, and/or other similar devices.

The network communications interface module 704 can include one or more wireless interfaces 712 and/or one or more wireline interfaces 714 that are configurable to communicate via a network, such as network 606 shown in FIG. 6.

The wireless interfaces 712 can include one or more wireless transmitters, receivers, and/or transceivers, such as a Bluetooth transceiver, a Zigbee transceiver, a Wi-Fi transceiver, a LTE transceiver, and/or other similar type of wireless transceiver configurable to communicate via a wireless network. The wireline interfaces 714 can include one or more wireline transmitters, receivers, and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network.

In some examples, the network communications interface module 704 can be configured to provide reliable, secured, and/or authenticated communications. For each communication described herein, information for ensuring reliable communications (i.e., guaranteed message delivery) can be provided, perhaps as part of a message header and/or footer (e.g., packet/message sequencing information, encapsulation header(s) and/or footer(s), size/time information, and transmission verification information such as CRC and/or parity check values). Communications can be made secure (e.g., be encoded or encrypted) and/or decrypted/decoded using one or more cryptographic protocols and/or algorithms, such as, but not limited to, DES, AES, RSA, Diffie-Hellman, and/or DSA. Other cryptographic protocols and/or algorithms can be used as well or in addition to those listed herein to secure (and then decrypt/decode) communications.

The processors 706 can include one or more general purpose processors and/or one or more special purpose processors (e.g., digital signal processors, application specific integrated circuits, etc.). The processors 706 can be configured to execute computer-readable program instructions 715 that are contained in the data storage 708 and/or other instructions as described herein (e.g., the method 400).

The data storage 708 can include one or more computer-readable storage media that can be read and/or accessed by at least one of processors 706. The one or more computer-readable storage media can include volatile and/or non-volatile storage components, such as optical, magnetic, organic or other memory or disc storage, which can be integrated in whole or in part with at least one of the processors 706. In some examples, the data storage 708 can be implemented using a single physical device (e.g., one optical, magnetic, organic or other memory or disc storage unit), while in other examples, the data storage 708 can be implemented using two or more physical devices.

The data storage 708 can include computer-readable program instructions 715 and perhaps additional data, such as but not limited to data used by one or more processes and/or threads of a software application. In some examples, data storage 708 can additionally include storage required to perform at least part of the herein-described methods (e.g., the method 400) and techniques and/or at least part of the functionality of the herein-described devices and networks.

Figure 7B:
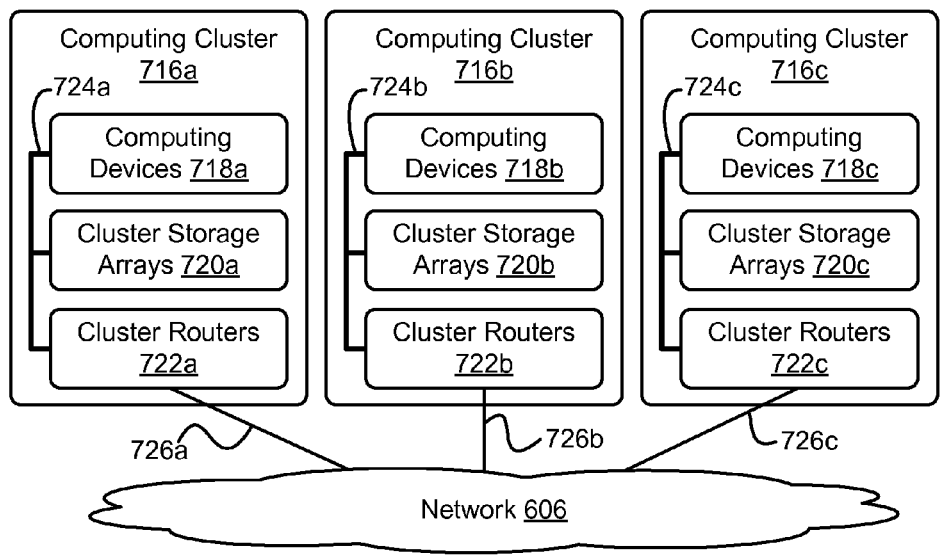
FIG. 7B illustrates a cloud-based server system, in accordance with an example embodiment.

FIG. 7B depicts a cloud-based server system, in accordance with an example embodiment. In FIG. 7B, functions of the server device 602 and/or 604 can be distributed among three computing clusters 716a, 716b, and 716c. The computing cluster 716a can include one or more computing devices 718a, cluster storage arrays 720a, and cluster routers 722a connected by a local cluster network 724a. Similarly, the computing cluster 716b can include one or more computing devices 718b, cluster storage arrays 720b, and cluster routers 722b connected by a local cluster network 724b. Likewise, computing cluster 716c can include one or more computing devices 718c, cluster storage arrays 720c, and cluster routers 722c connected by a local cluster network 724c.

In some examples, each of the computing clusters 716a, 716b, and 716c can have an equal number of computing devices, an equal number of cluster storage arrays, and an equal number of cluster routers. In other examples, however, each computing cluster can have different numbers of computing devices, different numbers of cluster storage arrays, and different numbers of cluster routers. The number of computing devices, cluster storage arrays, and cluster routers in each computing cluster can depend on the computing task or tasks assigned to each computing cluster.

In the computing cluster 716a, for example, the computing devices 718a can be configured to perform various computing tasks of the server device 602. In one example, the various functionalities of the server device 602 can be distributed among one or more of computing devices 718a, 718b, and 718c. The computing devices 718b and 718c in the computing clusters 716b and 716c can be configured similarly to the computing devices 718a in computing cluster 716a. On the other hand, in some examples, the computing devices 718a, 718b, and 718c can be configured to perform different functions.

In some examples, computing tasks and stored data associated with server devices 602 and/or 604 can be distributed across computing devices 718a, 718b, and 718c based at least in part on the processing requirements of the server devices 602 and/or 604, the processing capabilities of computing devices 718a, 718b, and 718c, the latency of the network links between the computing devices in each computing cluster and between the computing clusters themselves, and/or other factors that can contribute to the cost, speed, fault-tolerance, resiliency, efficiency, and/or other design goals of the overall system architecture.

The cluster storage arrays 720a, 720b, and 720c of the computing clusters 716a, 716b, and 716c can be data storage arrays that include disk array controllers configured to manage read and write access to groups of hard disk drives. The disk array controllers, alone or in conjunction with their respective computing devices, can also be configured to manage backup or redundant copies of the data stored in the cluster storage arrays to protect against disk drive or other cluster storage array failures and/or network failures that prevent one or more computing devices from accessing one or more cluster storage arrays.

Similar to the manner in which the functions of the server devices 602 and/or 604 can be distributed across computing devices 718a, 718b, and 718c of computing clusters 716a, 716b, and 716c, various active portions and/or backup portions of these components can be distributed across cluster storage arrays 720a, 720b, and 720c. For example, some cluster storage arrays can be configured to store the data of the server device 602, while other cluster storage arrays can store data of the server device 604. Additionally, some cluster storage arrays can be configured to store backup versions of data stored in other cluster storage arrays.

The cluster routers 722a, 722b, and 722c in computing clusters 716a, 716b, and 716c can include networking equipment configured to provide internal and external communications for the computing clusters. For example, the cluster routers 722a in computing cluster 716a can include one or more internet switching and routing devices configured to provide (i) local area network communications between the computing devices 718a and the cluster storage arrays 720a via the local cluster network 724a, and (ii) wide area network communications between the computing cluster 716a and the computing clusters 716b and 716c via the wide area network connection 726a to network 606. The cluster routers 722b and 722c can include network equipment similar to the cluster routers 722a, and the cluster routers 722b and 722c can perform similar networking functions for the computing clusters 716b and 716c that the cluster routers 722a perform for the computing cluster 716a.

In some examples, the configuration of the cluster routers 722a, 722b, and 722c can be based at least in part on the data communication requirements of the computing devices and cluster storage arrays, the data communications capabilities of the network equipment in the cluster routers 722a, 722b, and 722c, the latency and throughput of the local networks 724a, 724b, 724c, the latency, throughput, and cost of wide area network links 726a, 726b, and 726c, and/or other factors that can contribute to the cost, speed, fault-tolerance, resiliency, efficiency and/or other design goals of the moderation system architecture.

In examples, the configurations illustrated in FIGS. 6 and 7A-7B can be used for implementations described with respect to the method 400. For example, the computing device implementing the method 400 can be a cloud-based device (e.g., server devices 602 and/or 604). In this example, the computing device may be configured to receive information associated with search queries submitted by the programmable devices 608a-c in FIG. 6, or the computing devices 718a-c of FIG. 7B to determine spiking queries and generate corresponding factor graphs. The factor graphs can then be provided to speech recognition systems that may also be implemented in cloud-based device such as the server device 602 and/or 604.

Figure 8:
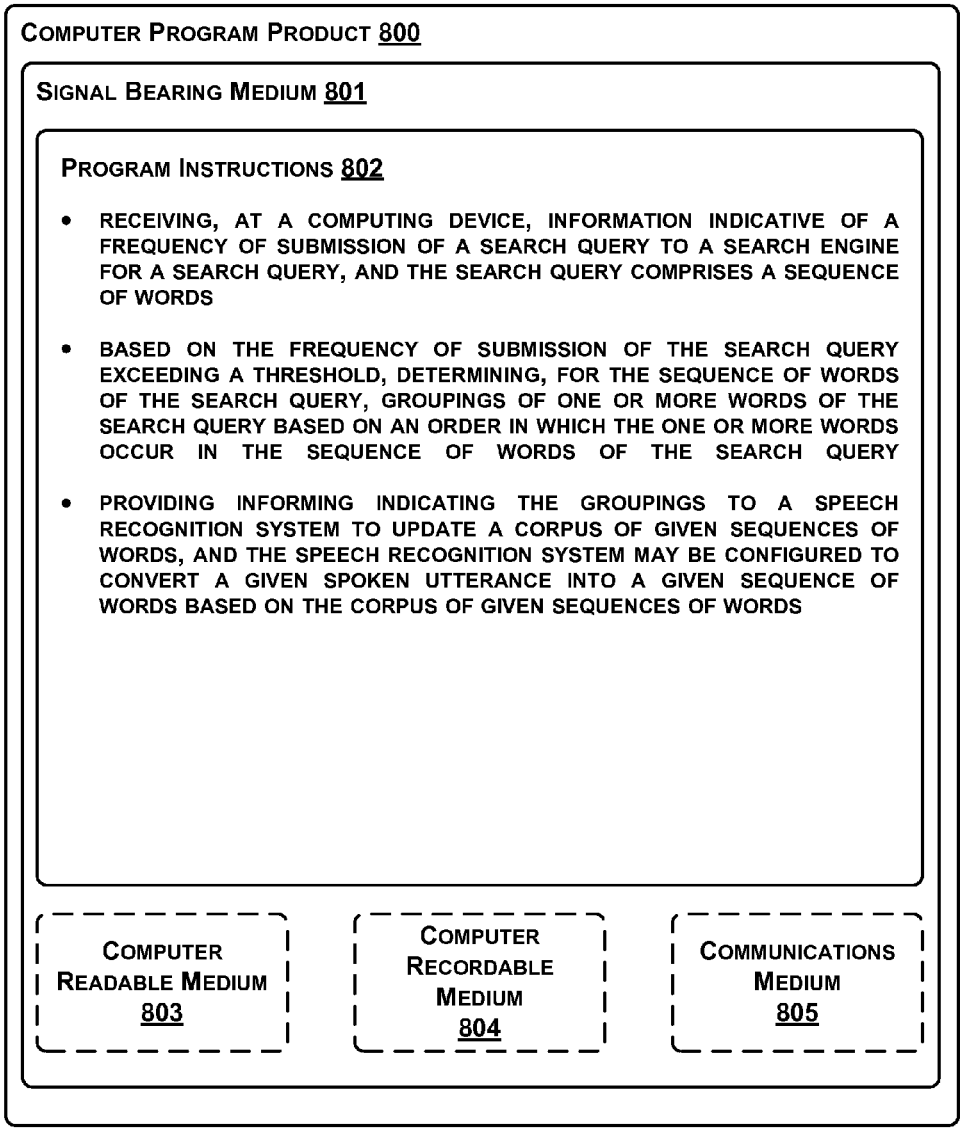
FIG. 8 is a schematic illustrating a conceptual partial view of an example computer program product that includes a computer program for executing a computer process on a computing device, arranged according to at least some embodiments presented herein.

In some examples, the disclosed methods (e.g., the method 400) may be implemented as computer program instructions encoded on a non-transitory computer-readable storage media in a machine-readable format, or on other non-transitory media or articles of manufacture. FIG. 8 is a schematic illustrating a conceptual partial view of an example computer program product that includes a computer program for executing a computer process on a computing device, arranged according to at least some embodiments presented herein.

In one embodiment, the example computer program product 800 is provided using a signal bearing medium 801. The signal bearing medium 801 may include one or more programming instructions 802 that, when executed by one or more processors may provide functionality or portions of the functionality described above with respect to FIGS. 1-7. In some examples, the signal bearing medium 801 may encompass a computer-readable medium 803, such as, but not limited to, a hard disk drive, a Compact Disc (CD), a Digital Video Disk (DVD), a digital tape, memory, etc. In some implementations, the signal bearing medium 801 may encompass a computer recordable medium 804, such as, but not limited to, memory, read/write (R/W) CDs, R/W DVDs, etc. In some implementations, the signal bearing medium 801 may encompass a communications medium 805, such as, but not limited to, a digital and/or an analog communication medium (e.g., a fiber optic cable, a waveguide, a wired communications link, a wireless communication link, etc.). Thus, for example, the signal bearing medium 801 may be conveyed by a wireless form of the communications medium 805 (e.g., a wireless communications medium conforming to the IEEE 802.11 standard or other transmission protocol).

The one or more programming instructions 802 may be, for example, computer executable and/or logic implemented instructions. In some examples, a computing device such as the programmable devices 608a-c in FIG. 6, or the computing devices 718a-c of FIG. 7B may be configured to provide various operations, functions, or actions in response to the programming instructions 802 conveyed to programmable devices 608a-c or the computing devices 718a-c by one or more of the computer readable medium 803, the computer recordable medium 804, and/or the communications medium 805.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method, comprising:
   receiving, at a computing device, information indicative of a frequency of submission of a search query to a search engine, wherein the search query comprises a sequence of words;
   based on the frequency of submission of the search query exceeding a threshold, determining, for the sequence of words of the search query, groupings of one or more words of the search query based on an order in which the one or more words occur in the sequence of words of the search query; and
   providing information indicating the groupings to a speech recognition system to update a corpus of given sequences of words, wherein the speech recognition system is configured to convert a given spoken utterance into a given sequence of words based on the corpus of given sequences of words.

2. The method of claim 1, wherein the search query includes one or more of a text string and a voice search query.

3. The method of claim 1, wherein the speech recognition system further includes probabilities of occurrence for the given sequences of words of the corpus, and wherein providing the groupings to the speech recognition system comprises updating the probabilities of occurrence based on the groupings and the information indicative of the frequency of submission of the search query to the search engine.

4. The method of claim 3, wherein providing the groupings to the speech recognition system comprises:
   updating the corpus of given sequences of words to include the groupings; and
   assigning to the groupings respective probabilities of occurrence that are higher than given probabilities of occurrences of other sequences of words in the corpus.

5. The method of claim 1, further comprising:
   updating the corpus of given sequences of words to include the groupings; and
   constraining, for the speech recognition system to transcribe the given spoken utterance, search space in the corpus to at least the groupings.

6. The method of claim 1, further comprising causing the speech recognition system to attempt to match the given spoken utterance to one of the groupings before attempting to match the given spoken utterance to other word sequences in the corpus.

7. The method of claim 1, further comprising assigning respective probabilities of occurrence for the groupings based on the information indicative of the frequency of submission of the search query, and wherein the respective probabilities of occurrence are time-varying.

8. The method of claim 1, further comprising:
   assigning to the groupings respective probabilities of occurrence, based on the information indicative of the frequency of submission of the search query;
   continuously receiving updated information for the frequency of submission of the search query; and
   updating the respective probabilities of occurrence based on the updated information.

9. The method of claim 8, wherein the respective probabilities of occurrence decay over time based on the updated information.

10. The method of claim 1, wherein the computing device includes the speech recognition system.

11. A computer readable medium having stored thereon instructions that, when executed by a computing device, cause the computing device to perform functions comprising:
    receiving information indicative of a frequency of submission of a search query to a search engine, wherein the search query comprises a sequence of words;
    based on the frequency of submission of the search query exceeding a threshold, determining, for the sequence of words of the search query, groupings of one or more words of the search query based on an order in which the one or more words occur in the sequence of words of the search query; and
    providing information indicating the groupings to a speech recognition system to update a corpus of given sequences of words, wherein the speech recognition system is configured to convert a given spoken utterance into a given sequence of words based on the corpus of given sequences of words.

12. The computer readable medium of claim 11, wherein the function of determining the groupings comprises generating a factor graph that includes automaton states and automaton arcs, each of the automaton arcs corresponding to a word from the sequence of words of the search query.

13. The computer readable medium of claim 12, wherein the function of determining the groupings comprises:
    selecting a first word represented by a first automaton arc connected to a first automaton state;
    continuing to a second automaton state adjacent to the first automaton state; and
    selecting a second word represented by a second arc connected to the second automaton state, wherein the second word is adjacent to the first word in the sequence of words of the search query.

14. The computer readable medium of claim 12, wherein a given grouping of the groupings is indicated to begin at any given automaton state in the factor graph.

15. A device comprising:
    at least one processor;
    data storage; and
    program instructions in the data storage that, upon execution by the at least one processor, cause the device to:
      receive information indicative of a frequency of submission of a search query to a search engine in a given period of time, wherein the search query comprises a sequence of words;

based on the information indicative of the frequency of submission of the search query to the search engine in the given period of time, determine, for the sequence of words of the search query, groupings of one or more words of the search query based on an order in which the one or more words occur in the sequence of words of the search query; and provide information indicating the groupings to a speech recognition system to update a corpus of given sequences of words, wherein the speech recognition system is configured to convert a given spoken utterance into a given sequence of words based on the corpus of given sequences of words.

16. The device of claim 15, wherein the program instructions, upon execution by the at least one processor, further cause the device to:

determine a metric based on the information indicative of the frequency of submission of the search query to the search engine in the given period of time, wherein the program instructions, upon execution by the at least one processor, cause the device to determine the groupings based on a comparison of the metric to a threshold.

17. The device of claim 15, wherein the speech recognition system includes probabilities of occurrence for the given sequences of words of the corpus, and wherein, to provide the groupings to the speech recognition system, the program instructions in the data storage, upon execution by the at least one processor, cause the device to update the probabilities of occurrence based on the groupings and the information indicative of the frequency of submission of the search query.

18. The device of claim 15, wherein the speech recognition system includes probabilities of occurrence for the given sequences of words of the corpus, and wherein, to provide the groupings to the speech recognition system, the program instructions in the data storage, upon execution by the at least one processor, cause the device to:

augment the corpus of given sequences of words with the groupings; and assign to the groupings respective probabilities of occurrence that are higher than given probabilities of occurrence of other sequences of words in the corpus.

19. The device of claim 15, wherein, to determine the groupings, the program instructions in the data storage, upon execution by the at least one processor, cause the device to generate a factor graph that includes automaton states and automaton arcs, each of the automaton arcs corresponding to a word from the sequence of words of the search query.

20. The device of claim 19, wherein, to determine a given grouping of the groupings, the program instructions in the data storage, upon execution by the at least one processor, cause the device to:

select a first word represented by a first automaton arc connected to a first automaton state;

continue to a second automaton state adjacent to the first automaton state; and select a second word represented by a second arc connected to the second automaton state, wherein the second word is adjacent to the first word in the sequence of words of the search query, and wherein the given grouping is allowed to begin at any given automaton state in the factor graph.

* * * * *